(12) United States Patent
Zhang et al.

(10) Patent No.: US 7,716,985 B2
(45) Date of Patent: May 18, 2010

(54) PIEZOELECTRIC QUARTZ ACCELEROMETER

(75) Inventors: Fuxue Zhang, Beijing (CN); Wei Zhang, Beijing (CN)

(73) Assignee: Beijing Information Technology Institute, Zhaoyang District, Beijing (CN)

( * ) Notice: Subject to any disclaimer, the term of this patent is extended or adjusted under 35 U.S.C. 154(b) by 330 days.

(21) Appl. No.: 11/974,544

(22) Filed: Oct. 14, 2007

(65) Prior Publication Data

US 2009/0301195 A1 Dec. 10, 2009

(30) Foreign Application Priority Data

Jul. 9, 2007 (CN) .................. 2007 1 0118526

(51) Int. Cl.
*G01P 15/09* (2006.01)
(52) U.S. Cl. .................................. 73/514.34
(58) Field of Classification Search ............ 73/514.29, 73/514.34, 493, 497, 514.36
See application file for complete search history.

(56) References Cited

U.S. PATENT DOCUMENTS

| 3,569,749 | A | * | 3/1971 | Zeiringer | 310/329 |
| 3,651,353 | A | * | 3/1972 | Hugli et al. | 310/334 |
| 4,091,679 | A | * | 5/1978 | Furusawa et al. | 73/497 |
| 6,397,677 | B1 | * | 6/2002 | Kinsley et al. | 73/514.34 |

\* cited by examiner

*Primary Examiner*—Helen C. Kwok

(57) ABSTRACT

A piezoelectric quartz accelerometer includes a sensitive element, a signal processing circuit, a base, an outer case, and a socket, wherein the sensitive element includes two round piezoelectric quartz wafers, and a supporting frame, wherein the two round piezoelectric quartz wafers are symmetrically mounted on both sides of the center axial line of the supporting frame; the sensitive element further includes an axial shock buffer unit and a transverse retaining unit for protecting overload of the two round piezoelectric quartz wafers; the signal processing circuit includes an oscillation circuit for obtaining frequency signal, a frequency differential forming circuit for extracting signal, a phase lock and times frequency circuit for amplifying signal, compensating zero phase, compensating non-linearization and compensating temperature, and an output circuit.

15 Claims, 6 Drawing Sheets

PIEZOELECTRIC QUARTZ ACCELEROMETER

BACKGROUND OF THE PRESENT INVENTION

1. Field of Invention

The present invention relates to a piezoelectric quartz accelerometer in a sensitive electronics mainly applied in the attitude stabilized and control system of the aircraft, robot, vehicle, ship, oil drilling platform, construction, industrial automation equipment, comprising a sensitive element, signal processing circuit, base, outer case and socket.

2. Description of Related Arts

Since J MRaajski from IBM determines the property between force and frequency of piezoelectric quartz through experiment in the 1960's, the piezoelectric quartz is used for accelerometer. For example, Kearfott Company adopts double mass blocks and double to develop a piezoelectric quartz accelerometer that can detect the gravity changes caused by the moon. US Army Space and Missile Defense Command and Allied Signal Aerospace Instrument System adopt double mass blocks and frequency differential structure to develop a piezoelectric quartz accelerometer that can measure a range up to 1200 g, and has a proportion coefficient of 1.1 Hz/g. U.S. Pat. Nos. 5,578,755 and 5,962,786 disclosed different piezoelectric quartz accelerometer embodiments. ONERA adopts vibration beam structure to develop a piezoelectric quartz accelerometer. However, the resolution, linearization, stability and startup speed of the above piezoelectric quartz accelerometers can not meet the requirement for high performance device, and the piezoelectric quartz accelerometer can not resist shock.

SUMMARY OF THE PRESENT INVENTION

A main object of the present invention is to provide a piezoelectric quartz accelerometer that has high resolution, linearization, stability and startup speed, and can resist shock.

Accordingly, in order to accomplish the above object, the present invention detects the force changing on the piezoelectric quartz caused by an accelerated object, so as to adjust the resonate frequency of the quartz resonator. Therefore, the present invention adopts two symmetrical mounted piezoelectric quartz wafers with same performance index in the sensitive element, wherein two wafers are spacedly apart, and their lead-in wires are connected with the excitation circuit respectively. The sensitive direction of the accelerometer is the center line of the two piezoelectric quartz wafers. When acceleration is detected, the force exerted on the piezoelectric quartz wafers change, wherein one gets an increasing pressure, and the other gets an increasing tension, so that one increases the frequency, and the other decreases the frequency. And then a digital signal proportional to the acceleration is obtained by difference frequency, therefore the acceleration can be measured by detecting resonate frequency variation of the quartz resonator.

As shown in FIG. 7, the present invention symmetrically mounts two quartz wafers with same property between the sensitive block and the base in the sensitive element. At the same time, they are composed of oscillator with their respective excitation circuit. The sensitive block is used for transferring the force produced by the acceleration to the two round piezoelectric quartz wafers. When there is no acceleration, the two round piezoelectric quartz wafers stands the same force from the sensitive block, so that the force inside is equal and the output signal is equal too; when there is a vertical acceleration, the two round piezoelectric quartz wafers stands the different force from the sensitive block, so that the output signal is not equal. According to the force-frequency property of the piezoelectric wafer, the following formula can be derived.

$$\Delta f = K_f \cdot \frac{f^2}{D \cdot n} \cdot \Delta F \quad (1)$$

In this formula, $\Delta f$ is resonate frequency variation of the piezoelectric quartz resonator; $\Delta F$ is an inertia force of the piezoelectric quartz resonator; D is the sectional width of the inertia force; $K_f$ is Ratajski coefficient of the piezoelectric quartz resonator; n is the harmonic times; and f is the resonate frequency of the piezoelectric quartz resonator. Known from the above formula, resonate frequency variation $\Delta f$ of the piezoelectric quartz resonator has linear relationship with the inertia force $\Delta F$.

When the acceleration of a is inputted, one of the two piezoelectric quartz wafers has an increasing pressure, and the other has an increasing tension. Suppose resonate frequency of the piezoelectric wafer is $f_0$ at balance state, resonate frequency of the wafer with increasing pressure becomes higher to $f_1 = f_0 + \Delta f_1$; resonate frequency of the wafer with increasing tension becomes smaller to $f_2 = f_0 - \Delta f_2$. The differential frequency output of the two piezoelectric quartz wafer is $$f = f_1 - f_2 = (f_0 + \Delta f_1) - (f_0 - \Delta f_2)$$

$$f = \Delta f_1 + \Delta f_2 \quad (2)$$

Because the thickness of the piezoelectric quartz wafer is far smaller than the diameter, the relationship among the inertia force F, F', the structure parameter of the L that is the distance between the mass center of the sensitive block and the attaching surface, H that is the distance between the two piezoelectric quartz wafer, and the acceleration a is $$F = \frac{L}{H} m(a+g) \quad (3)$$

$$F' = \frac{L}{H} m(a+g) \quad (4)$$

Take a $=0$ as a reference state, so $$F_0 = \frac{L}{H} mg, \text{ and } F'_0 = \frac{L}{H} mg;$$

when a $\neq 0$, the force variation of the two piezoelectric quartz wafer is $$\Delta F_1 = F - F_0 = \frac{L}{H} ma \quad (5)$$

$$\Delta F_2 = F' - F'_0 = \frac{L}{H} ma \quad (6)$$

Know from the formula (1), (2), (5), (6), $$f = 2K_f \cdot \frac{f_0^2}{D \cdot n} \cdot \frac{L}{H} m \cdot a = Ka \quad (7)$$

In this formula, $$K = 2K_f \cdot \frac{f_0^2}{D \cdot n} \cdot \frac{L}{H} m$$

is the proportional coefficient, m is the mass of the sensitive block. Known from the formula (7), the acceleration can be determined by measuring the differential frequency f.

The piezoelectric quartz accelerometer of the present invention comprises a sensitive element, a signal processing circuit, a base, an outer case, and a socket. The base for supporting and the outer case are set up to form a cavity. The sensitive element for testing and the signal processing circuit are mounted on the base. The signal processed and the power supply is led out through socket. The sensitive element comprising two round piezoelectric quartz wafers symmetrically mounted on both sides of the centre axial line of the column supporting frames. One supporting frame is mounted on the pallet, and the pallet is mounted on the base. The sensitive block is mounted on another supporting frame. The signals of two round piezoelectric quartz wafers are led out by wire, and are connected with respective excitation circuit forming an oscillation circuit. There are three preferred structures for mounting the two round piezoelectric quartz wafers of the sensitive element in the present invention: a structure with double beams and a single island, a structure with three beams and a signal island, and a structure with symmetrical attached pieces.

The sensitive element comprises an axial shock absorber and a transverse retaining unit for protecting overload of the two round piezoelectric quartz wafers. The axial level overload protective unit comprises a sensitive block and a shock pad between the supporting frame and the pallet. The sensitive block comprises three column segments with different diameter, wherein said segment with big diameter is block having a mass adjusting block, said segment with medium diameter is elastic block, preferable a spring for resist shock, and said segment with small diameter is mounting bolt for mounting another supporting frame. The sensitive block of the sensitive element has four preferred structures: a structure with signal spiral, a structure with double spiral, a structure of "工"-shape with two holes, and a structure of "工"-shape with three holes. The transverse retaining unit comprises a retaining frame, four adjustable retaining bolts, a retaining bolt, and a fastening bolt between said adjustable retaining bolts and said retaining bolt and said sensitive block.

The sealed cover of the cavity of the sensitive element and the base are sealed by a sealed structure with a sealed gasket, and fastened by a bolt. There are two preferred structures: an engaged structure with a protruding ring and a concave ring, an engaged structure with a protruding wedge and a concave wedge.

As shown in FIG. 8, the signal processing circuit comprises an oscillation circuit, frequency differential forming circuit for extracting signal, phase lock and times frequency circuit for amplifying signal, compensating zero phases, compensating non-linearization and compensating temperature, and output circuit. When an acceleration a is input, the output frequency signal is acquired by the oscillation circuit, is extracted and transformed by a frequency differential and transforming circuit, and is amplified by a phase lock and times frequency circuit. A compensating and output compensates zero phases, non-linearization and temperature circuit, and outputs a digital signal having linearization relationship with the acceleration. The magnitude and polarization of the digital signal can precisely reflect the magnitude and direction of the acceleration.

The resolution rate of the piezoelectric quartz accelerometer is less than $5*10^{-5}$ g; the non-linearization degree is less than $1*10^{-5}$ g; the measurement range is from $10^{-4}$ g to $10^2$ g; the working temperature range is from $-40°$ C. to $80°$ C.; the gradation factor temperature coefficient is less than 15 ppm/° C.; the start up time is less than 20 s; the strength resisting overload shock is bigger than 110 g. Comprising with ordinary piezoelectric accelerometer, the accelerometer of the present invention has advantage of high resolution rate, high stability, low non-linearization, quick start up time, wide measurement range and working temperature range, high strength for resisting overload shock, and digital output.

These and other objectives, features, and advantages of the present invention will become apparent from the following detailed description, the accompanying drawings, and the appended claims.

BRIEF DESCRIPTION OF THE DRAWINGS

FIG. 3 is a sectional view of the piezoelectric quartz wafers of the present invention, wherein

FIG. 4 is a structure diagram of sensitive block of the sensitive element of the present invention, wherein

FIG. 6 is a sectional view of sealed cavity of the sensitive element of the present invention, wherein

DETAILED DESCRIPTION OF THE PREFERRED EMBODIMENT

Figure 1:
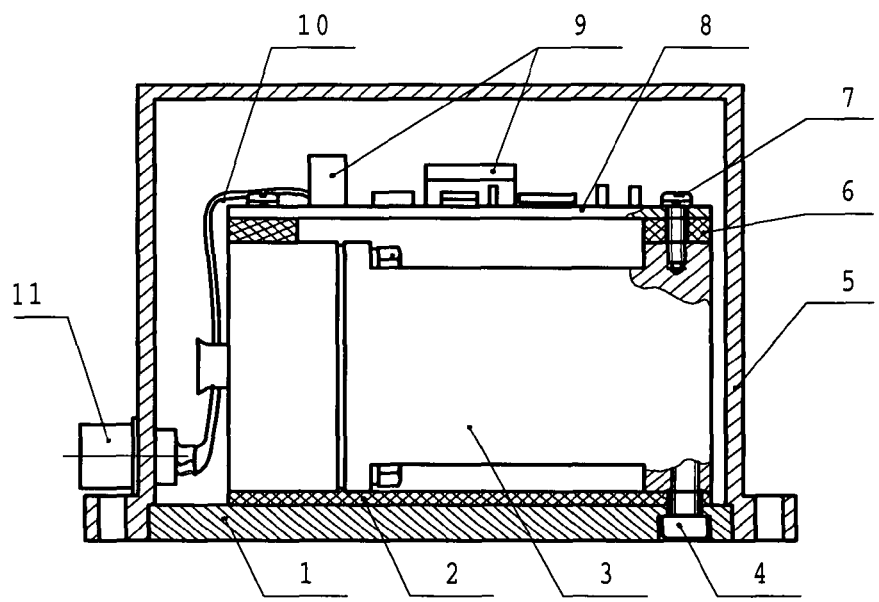
FIG. 1 is a sectional view of the piezoelectric accelerometer of the present invention.

The piezoelectric quartz accelerometer of the present invention comprises a sensitive element 3, signal processing circuit 8, base 1, the outer case 5, and the socket 11. As shown in FIG. 1, the base 2 and the outer case 5 are closely attached to become a cavity. The sensitive element 3 is mounted on the base 1 by a bolt 4, and a shock pad 2 is mounted under the sensitive element 3. The signal processing circuit 8 and electronic element 9 are fastened to the sensitive element 3 by circuit board bolt 7. There is an insulation pad 6 between the signal processing circuit 8 and the sensitive element 3. The power and signal are in and out through the socket 11 by cable 10.

Figure 2:
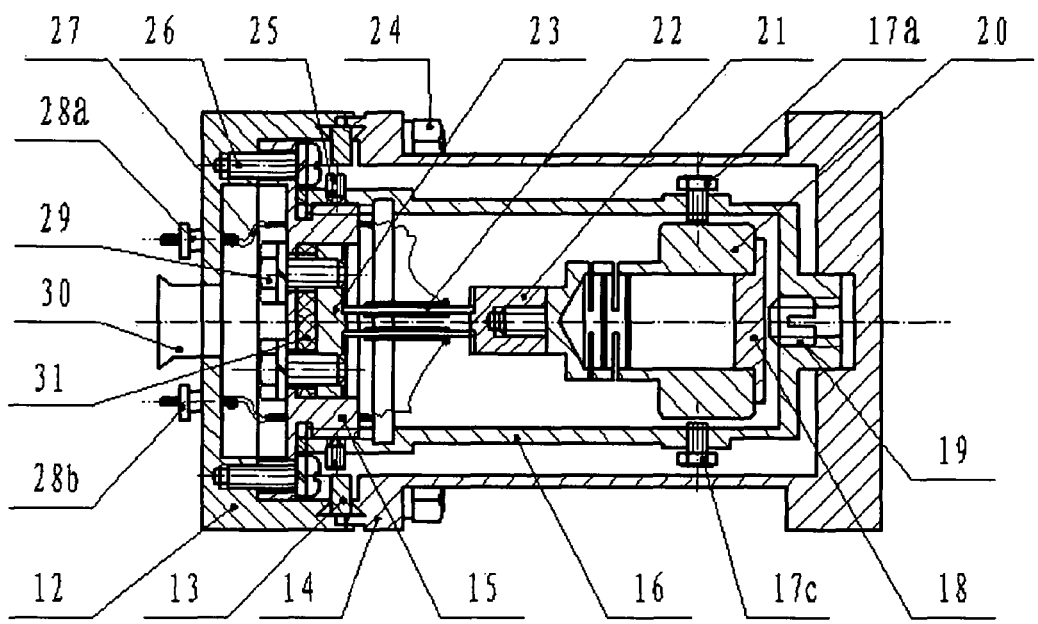
FIG. 2 is a sectional view of the sensitive element of the piezoelectric accelerometer of the present invention.

The sensitive element 3 comprises two round piezoelectric quartz wafer 22 symmetrically mounted on the both sides of the center line between the first column frame 21 and the second column frame 23. As shown in FIG. 2, the second frame 23 is mounted on a plate 15 by a bolt 29. The plate 15 is fastened to the base 12 of the sensitive element 3 by a plate screw 26. The sensitive block 20 presses on the supporting frame 21. The sealing cover 14 of the sensitive element 3 covers on the base 12. The base 12 comprises a first connector 28a, a second connector 28b, and a vacuum pipe 30 in the sealing cover 14. The signal of the piezoelectric quartz wafer 22 is led out from the connector 28a and 28b through a connecting wire 27, and is connected to the corresponding excitation circuit to become an oscillation circuit.

Figure 3A:
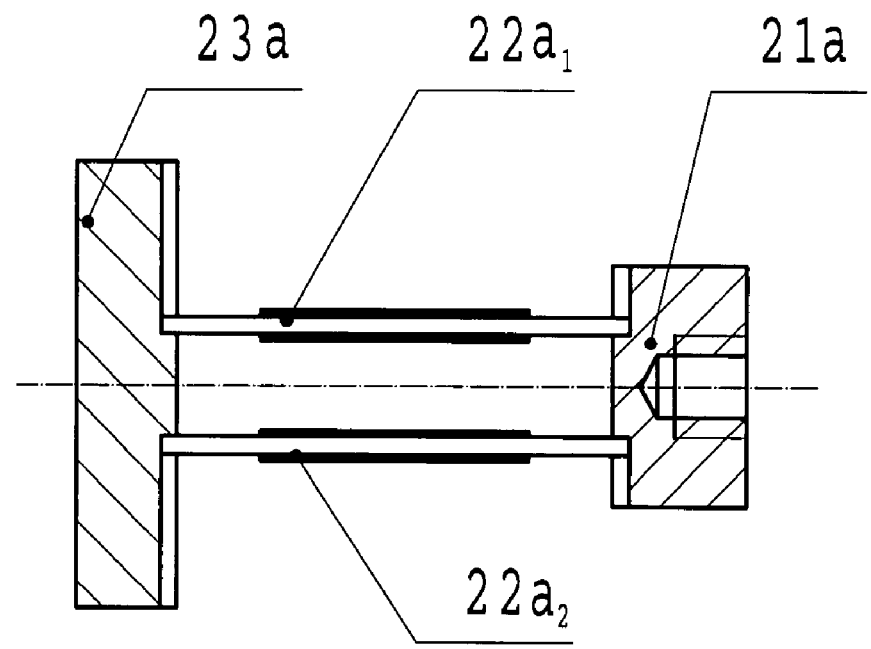
FIG. 3a is a structure with two beams and one island.
Figure 3B:
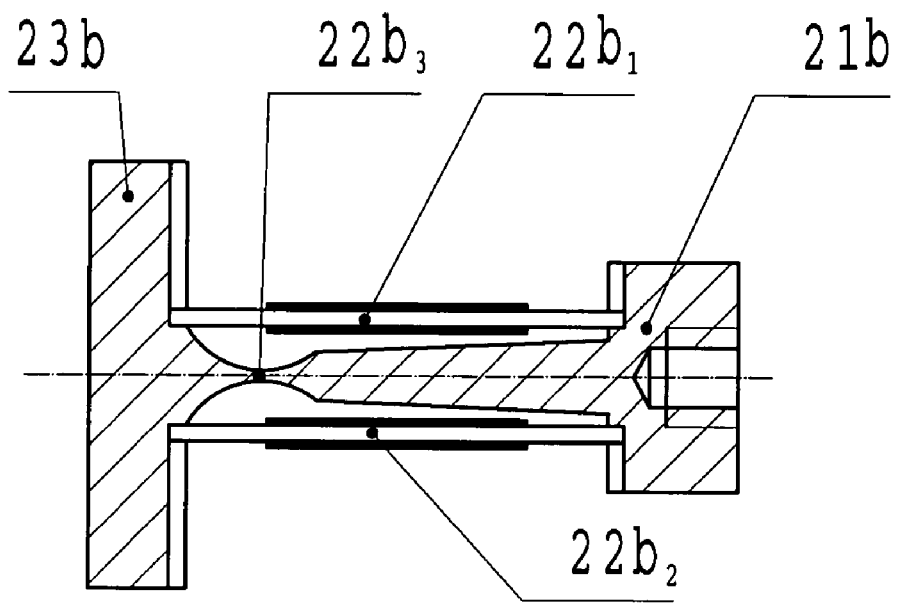
FIG. 3b is a structure with three beams and island, and 3c is a structure with symmetrical attached pieces.
Figure 3C:
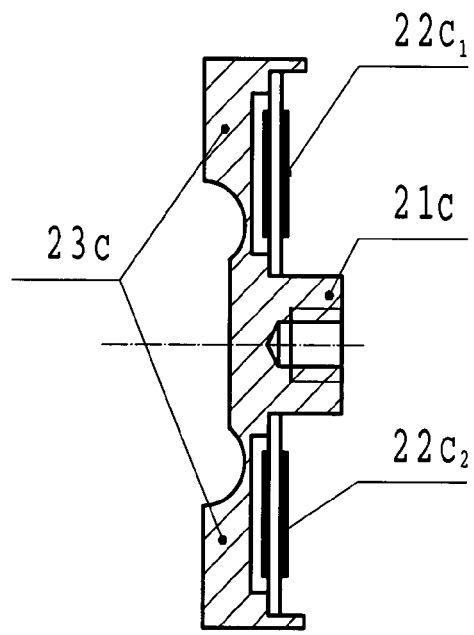

Referring to the FIGS. 3a, 3b, and 3c, three mounting structures of the round piezoelectric quartz wafer 22 of the piezoelectric quartz accelerometer.

As shown in FIG. 3a, use an adhesive clip to fasten a first supporting frame 21a and a second supporting frame 23a, apply adhesive agent on the adhesive cambered surface of the supporting frame 21a and 23a, and imbed the quartz wafer 22a1 and 22a2 in the cambered surface, wherein the two piezoelectric quartz wafer 22a1 and 22a2 are parallel. The adhesive agent is made of resin, the supporting frame is made of 1Cr18Ni9Ti, the depth of the adhesive cambered surface is 0.2 mm-1 mm, and the space between the two piezoelectric quartz wafer is 1 mm-5 mm. The lead-in wires of the two piezoelectric quartz wafers are connected with the excitation circuit respectively. The sensitive direction of the accelerometer is the center connecting direction of the two piezoelectric quartz wafers. When acceleration is inputted, the forces exerted on the two piezoelectric quartz wafer change, one wafer increases in pressure, and the other increases in tension, so that one wafer increases its frequency, and the other decreases its frequency. A digital signal proportional to the acceleration can be obtained through the differential frequency. This structure has an advantage of high sensitivity, which is suitable to detect small acceleration signal.

As shown in FIG. 3b, the supporting frame 21b and 23b are connected by a flexibility beam 22b3, wherein the supporting frame 21b and 23b and the flexibility beam 22b3 are made by one piece of blank. Apply adhesive agent on the adhesive cambered surface of the supporting frame 21b and 23b, and imbed the quartz wafer 22b1 and 22b2 in the cambered surface, that is equal to add a connecting beam between the two piezoelectric quartz wafers 22b1 and 22b2. The parallel space between the two piezoelectric quartz wafers is 3 mm-8 mm. The flexible hinges of flexible beam have a thickness of 0.2 mm-0.7 mm, and are made of 1Cr18Ni9Ti. The lead-in wires of the two piezoelectric quartz wafers are connected with the excitation circuit respectively. The sensitive direction of the accelerometer is the center connecting direction of the two piezoelectric quartz wafers. When acceleration is inputted, the forces exerted on the two piezoelectric quartz wafer change, one wafer increases in pressure, and the other increases in tension, so that one wafer increases its frequency, and the other decreases its frequency. A digital signal proportional to the acceleration can be obtained through the differential frequency. This structure has an advantage of resisting shock, which is suitable to detect high acceleration.

As shown in FIG. 3c, the two supporting frame 21c and 23c are integral structure, the supporting frame 21c is in the center, and the supporting frame 23c is symmetrically on the both sides. Apply adhesive agent on the adhesive cambered surface of the supporting frame 21c and 23c, and imbed the quartz wafer 22c1 and 22c2 in the cambered surface. The two flexible hinges of the supporting frame have a thickness of 0.2 mm-0.7 mm, and are made of 1Cr18Ni9Ti. The lead-in wires of the two piezoelectric quartz wafers are connected with the excitation circuit respectively. The sensitive direction of the accelerometer is the center connecting direction of the two piezoelectric quartz wafers. When acceleration is inputted, the forces exerted on the two piezoelectric quartz wafer change, one wafer increases in pressure, and the other increases in tension, so that one wafer increases its frequency, and the other decreases its frequency. A digital signal proportional to the acceleration can be obtained through the differential frequency. This structure is suitable to detect high acceleration.

Figure 4A:
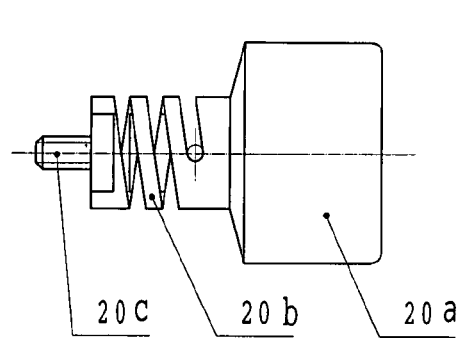
FIG. 4a illustrates a structure with single spiral.
Figure 5:
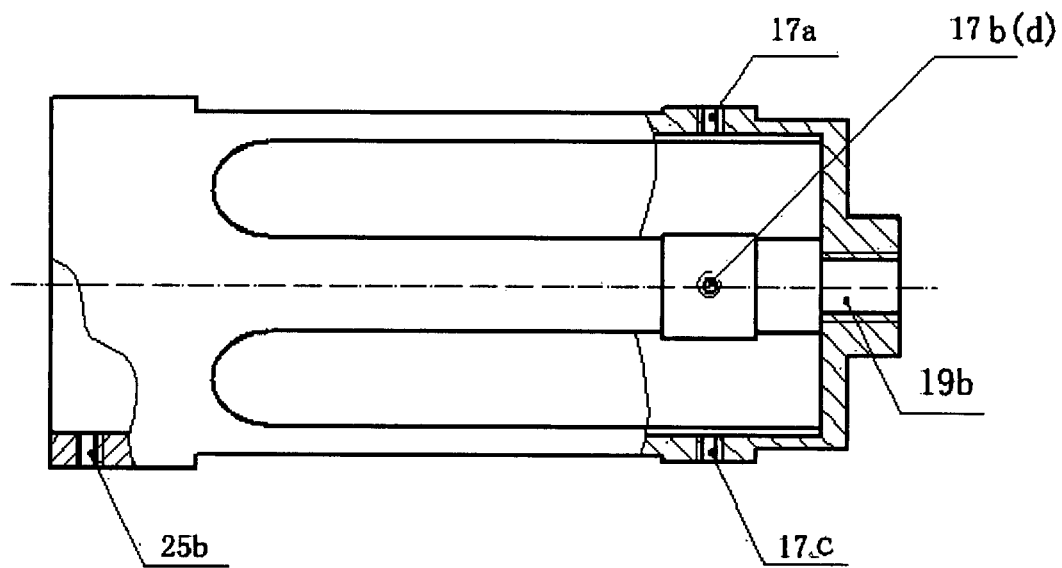
FIG. 5 is a sectional view of the retaining and shock protective frame of the sensitive element of the present invention.

The sensitive element 3 comprises an axial shock absorber and a transverse retaining unit for protecting the two round piezoelectric quartz wafers 22 from overload. The axial shock absorber comprises a sensitive block 20 and a shock pad 31 between the supporting frame 23 and the plate 15 to protect sensitive element 3 from overload in the axial direction. The sensitive block 30, shown in FIG. 4a, comprises three segments of column with different diameter, wherein the segment with big diameter is block 20a having a mass adjusting block, the segment with medium diameter is elastic block 20b, and the segment with small diameter is 20c for mounting bolt. The elastic block 20b can be embodied as a spring. The retaining frame 16 is mounted outside the plate, and comprises adjustable retaining bolts 17a, 17b, 17c, and 17d provided surrounding the mass block 20a, and a retaining bolt 19 provided on the side of the mass block 20a, so as to become a transverse retaining unit for protecting sensitive element 3 from transverse overload. As shown in FIG. 2, the retaining frame 16 further comprises a fastening bolt 25 to adjust the space between the retaining bolt 17a, 17b, 17c, and 17d and the sensitive block, wherein the space determines the swing range of the sensitive block in the axial and transverse direction. The retaining frame 16 is made of the same material with the supporting frame 21. As shown in FIG. 5, the retaining frame 16 has four retaining bolt 17a, 17b, 17c, and 17d provided surrounding the mass block 20a, a retaining bolt 19 provided on the side of the mass block 20a, and a fastening bolt 25. The retaining frame 16 is made of the same material with the supporting frame 21.

The elastic block of the sensitive block 20 of the piezoelectric quartz accelerometer can be embodied as four alternatives. First, as shown in FIG. 4a, the sensitive block 20 comprises three columns with different diameter, a mass block 20a, an elastic body 20b as a spring, and a bolt 20c, wherein the three columns are manufactured as an integral part, and are made of spring steel, such as 1Cr18Ni9Ti. Single-spiral elastic body 20b has a spiral spacing 2 mm-6 mm, slot width 1 mm-2 mm, inner spiral diameter 5 mm-8 mm, and outer spiral diameter 10 mm-14 mm. The elastic body 20b can buffer the strong shock in the axial direction for protecting the piezoelectric quartz wafer of the accelerometer.

Figure 4B:
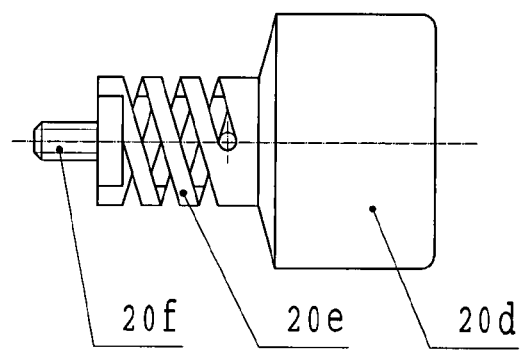
FIG. 4b illustrates a structure with double spiral.

As shown in FIG. 4b, the sensitive block comprises mass block 20d, double-spiral elastic body 20e and a bolt 20f, which are manufactured as an integral part, and are made of same material mentioned above. The double-spiral elastic body has a spiral spacing 4 mm-8 mm, a slot width 1 mm-2 mm.

Figure 4C:
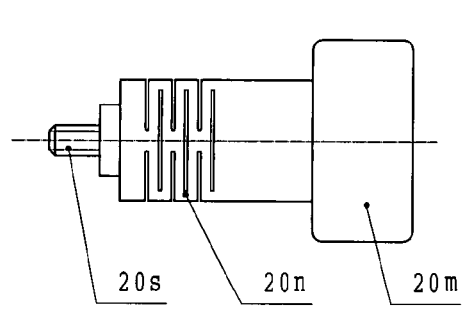
FIG. 4c illustrates a structure of "工"shape with two holes.

As shown in FIG. 4c, a "I"-shaped sensitive block with two holes comprises a mass block 20m, a "I"-shaped elastic body 20n with two holes, and a bolt 20s, which are manufactured as an integral part, and are made of same material mentioned above. The "⊥"-shaped elastic body has a spacing 0.8 mm-2 mm, slot width 0.3 mm-0.5 mm, column width 1 mm-4 mm.

Figure 4D:
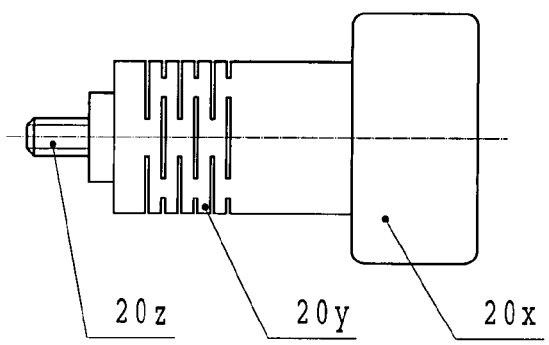
FIG. 4d illustrates a structure of "工"shape with three holes.

As shown in FIG. 4d, a "⊥"-shaped sensitive block with three holes comprises a mass block 20x, a "⊥"-shaped elastic body 20y with three holes, and a bolt 20z, which are manufactured as an integral part, and are made of same material mentioned above. The "⊥"-shaped elastic body with three holes has a spacing 0.8 mm-2 mm, slot width 0.3 mm-0.5 mm, column width 1 mm-4 mm.

Figure 6:
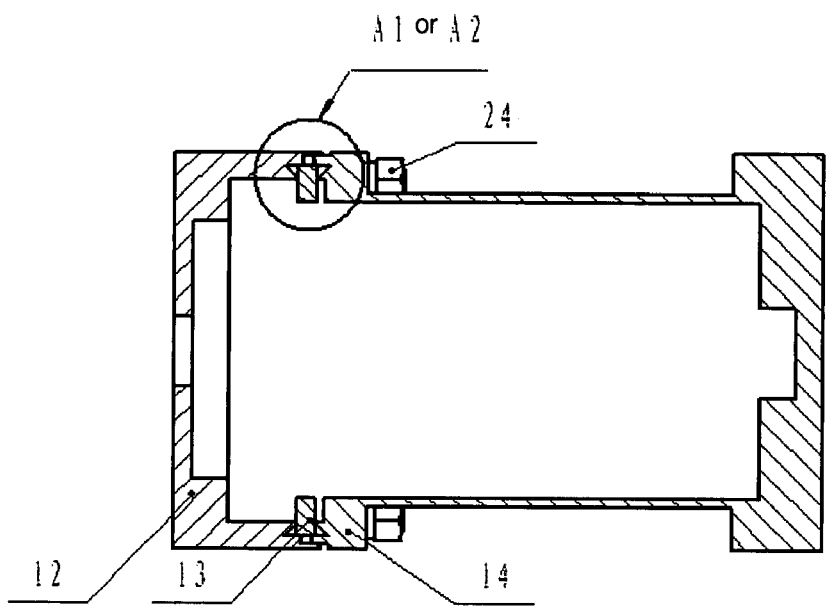
Figure 6A:
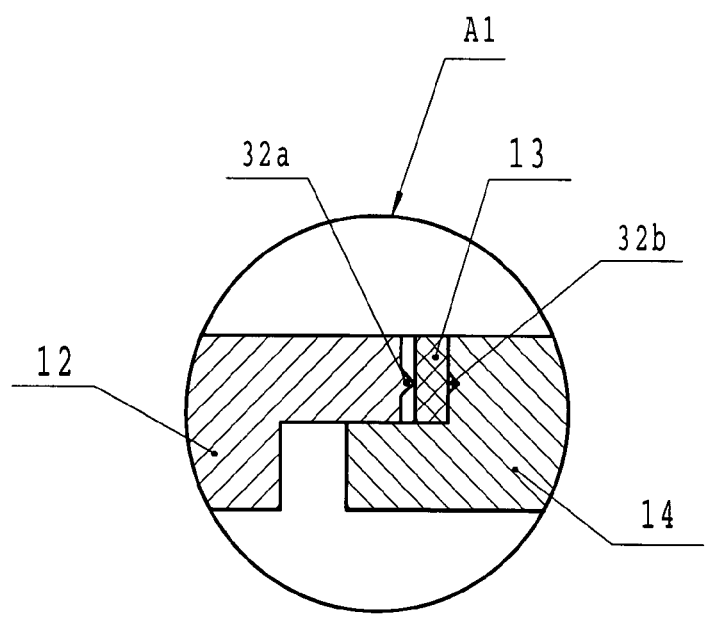
FIG. 6a is a structure of a protruding ring and a concave ring.
Figure 6B:
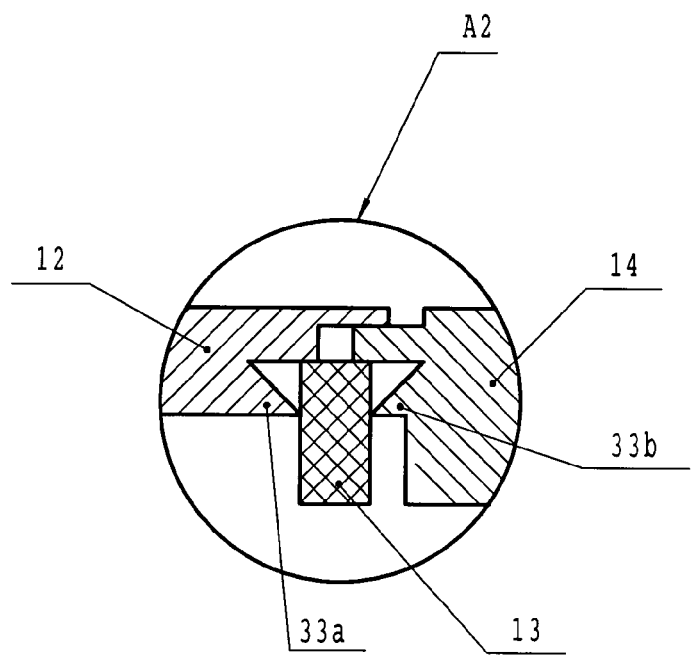
FIG. 6b is a structure of a protruding wedge and a concave wedge.
Figure 7:
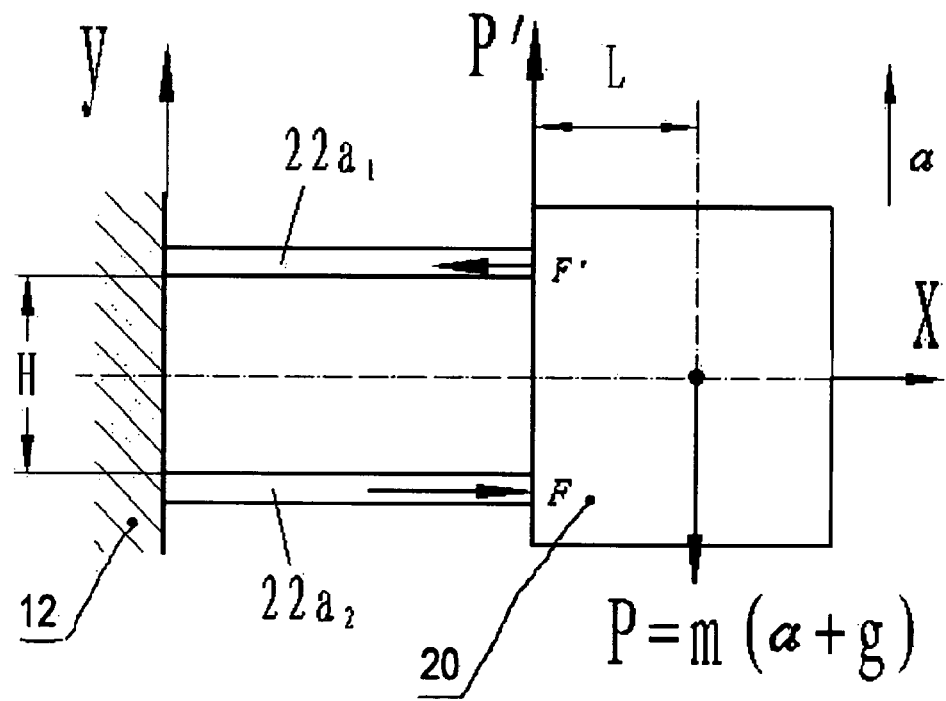
FIG. 7 is a schematic view of operational principle of the sensitive element of the present invention.
Figure 8:
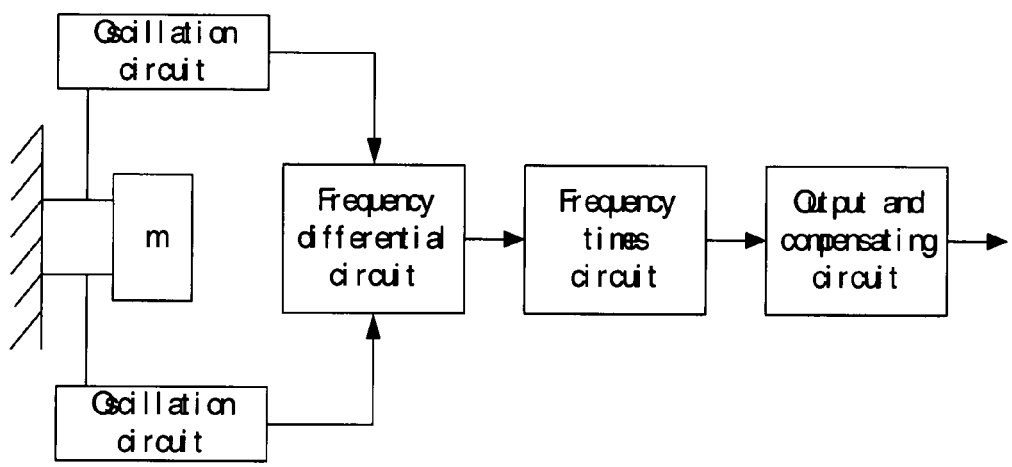
FIG. 8 is a block diagram of the signal processing circuit of the present invention

The sealing cover 14 and the base 12 are sealedly closes by a sealing gasket 13, and fastened by a bolt 24, as shown in FIG. 6. To achieve a better effect, sealing cover 14 and the base 12 are pushed to be sealed. Two sealing structures are given as below.

As shown in FIG. 6, the base 12 comprises a protruding sealing positioning ring 32a, and the sealing cover 14 comprises a concave sealing positioning ring 32b. Use a fastening clip to extrude the sealing cover 14 and the base 12, the protruding sealing positioning ring 32a of the base 12 presses and distorts the sealing gasket 13, and imbed into the concave sealing positioning ring 32b of the sealing cover 14, which are fastened by a bolt 24, so as to seal the cavity. The sealing cavity 14 and the base 12 are made of the same material with the sensitive block 20, and the sealing gasket is made of oxygen-free copper.

The protruding sealing positioning ring 33a can be embodies as a wedge shape, and the tip of the wedge has a guiding curve; the concave sealing positioning ring 33b can be embodied as a wedge shape, and the tip of the wedge has a guiding curve, wherein the wedge angle is 45-90 degree, and the height is 0.5 mm-1.5 mm. Use a fastening clip to extrude the sealing cover 14 and the base 12, the protruding sealing positioning ring 33a of the base 12 presses and distorts the sealing gasket 13, and imbed into the concave sealing positioning ring 33b of the sealing cover 14, which are fastened by a bolt 24, so as to seal the cavity.

TABLE 1 the performance of the piezoelectric quartz accelerometer

| Technique index | Technique performance |
| --- | --- |
| Measuring range (g) | $10^{-4}$ g~$10^2$ g |
| Output format | Digital output |
| Shift value(mg) | 0.5 |
| Value range (g) | $\leq 5 \times 10^{-5}$ |
| Non-linearization degree | $\leq 1 \times 10^{-5}$ |
| misalignment ($\delta_p$) | <|30"| |
| angel ($\delta_o$) | <|30"| |
| Second order non-linearization coefficient ($\mu g/g^2$) | $\leq 10$ |
| Gradation factor temperature coefficient (ppm/□) | $\leq 15$ |
| Misalignment temperature coefficient ($\mu g$/□) | $\leq 20$ |
| Misalignment monthly stability ($\mu g$) | $\leq 20$ |
| Gradation factor monthly stability (ppm) | $\leq 20$ |
| Temperature range (□) | −40~80 |
| Operation voltage (V) | ±15 |
| Operation current (mA) | $\leq 20$ |
| Weight (g) | <80 |

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A piezoelectric quartz accelerometer comprising: a sensitive element, a signal processing circuit, a base, an outer case, and a socket for leading out signals produced by said signal processing circuit, wherein said base and said outer case are closely attached to become a cavity, said sensitive element and said signal processing circuit are mounted on said base, wherein said sensitive element comprises two round piezoelectric quartz wafers, a first supporting frame and a second supporting frame, wherein said two round piezoelectric quartz wafers are symmetrically mounted on both sides of a centre axial line of said first supporting frame and said second supporting frame; said sensitive element further comprises an axial shock buffer unit and a transverse retaining unit for protecting overload of said two round piezoelectric quartz wafers; said sensitive element has a sealed cavity which is formed by a sealing cover and a base of said sealed cavity, sealed by a sealing sturcture with a sealing gasket, and fastened by a bolt; said signal processing circuit comprises an oscillation circuit for obtaining a frequency signal from said two round piezoelectric quartz wafers under an acceleration, a frequency differential forming circuit for extracting the frequency signal, a phase lock and times frequency circuit for amplifying the frequency signal, compensating zero phase, compensating non-linearization and compensating temperature, and an output circuit for outputting a digital signal having linearization relationship with the acceleration, wherein a magnitude and a polarization of the digital signal precisely reflects a magnitude and a direction of the acceleration.

2. The piezoelectric quartz accelerometer, as recited in claim 1, wherein said two round piezoelectric quartz wafers are mounted between said first supporting frame and said second supporting frame in parallel, and said two round piezoelectric quartz wafers comprise two lead-in wires, and two excitation circuits, wherein said two lead-in wires connect with said two excitation circuits respectively.

3. The piezoelectric quartz accelerometer, as recited in claim 1, wherein said sensitive element further comprises a flexible beam, wherein said flexible beam is between said two round piezoelectric quartz wafers, said flexible beam and said two round piezoelectric quartz wafers are mounted between said first supporting frame and said second supporting frame in parallel, and said two round piezoelectric quartz wafers comprise two lead-in wires, and two excitation circuits, wherein said two lead-in wires connect with said two excitation circuits respectively.

4. The piezoelectric quartz accelerometer, as recited in claim 1, wherein said second supporting frame is on both sides of said first supporting frame, wherein said two round piezoelectric quartz wafers are mounted symmetrically on said first supporting frame and said second supporting frame, and said two round piezoelectric quartz wafers comprise two lead-in wires, and two excitation circuits, wherein said two lead-in wires connect with said two excitation circuits respectively.

5. The piezoelectric quartz accelerometer, as recited in claim 1, further comprising a plate, wherein said axial shock buffer unit comprises a sensitive block and a shock pad provided between said second supporting frame and said plate, wherein said sensitive block is flexible, and comprises a first column segment with biggest diameter, a second column segment with medium diameter, and a third column segment with smallest diameter, wherein said first column segment with biggest diameter is a mass block having a mass adjusting block, said second column segment with medium diameter is an elastic block, and said third column segment with smallest diameter is a mounting bolt; said transverse retaining unit comprises a retaining frame mounting on an outer side of said plate, four adjustable retaining bolts provided around said retaining frame, a retaining bolt provided on a side of said mass block, and a fastening bolt for adjusting a distance between said adjustable retaining bolts and said sensitive block and a distance between said retaining bolt and said sensitive block.

6. The piezoelectric quartz accelerometer, as recited in claim 5, wherein said mass block, said elastic block and said mounting bolt of said sensitive block are manufactured as an integral part, said elastic block is a single-spiral elastic body that has a spiral spacing 2 mm-6 mm, slot width 1 mm-2 mm, inner spiral diameter 5 mm-8 mm, and outer spiral diameter 10 mm-14 mm.

7. The piezoelectric quartz accelerometer, as recited in claim 5, wherein said mass block, said elastic block and said mounting bolt of said sensitive block are manufactured as an integral part, said elastic block is a double-spiral elastic body that has a spiral spacing 4 mm-8 mm, a slot width 1 mm-2 mm.

8. The piezoelectric quartz accelerometer, as recited in claim 5, wherein said mass block, said elastic block and said mounting bolt of said sensitive block are manufactured as an integral part, said elastic block is a ""工""-shaped elastic body with two holes, wherein said ""工""-shaped elastic body has a spacing 0.8 mm-2 mm therebetween, a slot width 0.3 mm-0.5 mm, a column width 1 mm-4 mm.

9. The piezoelectric quartz accelerometer, as recited in claim 5, wherein said mass block, said elastic block and said mounting bolt of said sensitive block are manufactured as an integral part, said elastic block is a ""工""-shaped elastic body with three holes, wherein said ""工""-shaped elastic body with three holes has a spacing 0.8 mm-2 mm therebetween, a slot width 0.3 mm-0.5 mm, a column width 1 mm-4 mm.

10. The piezoelectric quartz accelerometer, as recited in claim 2, wherein said first supporting frame and said second supporting frame are made of 1Cr18Ni9Ti.

11. The piezoelectric quartz accelerometer, as recited in claim 3, wherein said first supporting frame and said second supporting frame are made of 1Cr18Ni9Ti.

12. The piezoelectric quartz accelerometer, as recited in claim 4, wherein said first supporting frame and said second supporting frame are made of 1Cr18Ni9Ti.

13. The piezoelectric quartz accelerometer, as recited in claim 5, wherein said sensitive block, said first supporting frame and said second supporting frame are made of 1Cr18Ni9Ti.

14. The piezoelectric quartz accelerometer, as recited in claim 1, wherein said base of the sealed cavity comprises a protruding sealing positioning ring, said sealing cover comprises a concave sealing positioning ring, said sealing gasket is clipped between said base of the sealed cavity and said sealing cover to seal said sensitive element.

15. The piezoelectric quartz accelerometer, as recited in claim 1, wherein said base of the sealed cavity comprises a protruding sealing positioning ring having a first wedge shape, said sealing cover comprises a concave sealing positioning ring having a second wedge shape, said sealing gasket is clipped between said base of the sealed cavity and said sealing cover to seal said sensitive element.

* * * * *